[19] United States Patent
Chung

[11] 4,071,279
[45] Jan. 31, 1978

[54] SOLID POLYURETHANE TIRE AND WHEEL ASSEMBLY

[75] Inventor: Daniel A. Chung, North Canton, Ohio

[73] Assignee: The Goodyear Tire & Rubber Company, Akron, Ohio

[21] Appl. No.: 570,154

[22] Filed: Apr. 21, 1975

[51] Int. Cl.² ............... C08K 5/07; C08K 5/10; C08K 5/12
[52] U.S. Cl. ............... 301/63 PW; 152/311; 152/323; 260/31.2 N; 260/31.4 R; 260/31.8 N; 260/32.8 N; 264/275
[58] Field of Search ............ 260/77.5 AN, 77.5 AM, 260/77.5 AP, 31.2 N, 31.4 R, 31.8 N, 32.8 N

[56] References Cited
U.S. PATENT DOCUMENTS

| | | | |
|---|---|---|---|
| 2,866,774 | 12/1958 | Price | 260/77.5 AP |
| 3,168,773 | 2/1965 | Frye | 152/323 |
| 3,169,945 | 2/1965 | Hostettler et al. | 260/77.5 AN |
| 3,377,322 | 4/1968 | Witsiepe | 260/31.8 N |
| 3,591,561 | 7/1971 | Kazama et al. | 260/77.5 AN |
| 3,701,374 | 10/1972 | McGillvary | 260/77.5 AM |
| 3,755,261 | 8/1973 | Van Gulick | 260/77.5 AM |
| 3,891,606 | 6/1975 | Kogon | 260/77.5 AM |
| 3,952,786 | 4/1976 | Kreling | 152/323 |

Primary Examiner—Sandra M. Person
Attorney, Agent, or Firm—F. W. Brunner; H. C. Young, Jr.

[57] ABSTRACT

A solid industrial polyurethane tire and a wheel assembly comprised of such a tire adhered to a rigid central core, or hub. The hub is generally adaptable to fit onto an axle of an industrial vehicle. Said polyurethane, itself, is prepared by reacting a complex of 4,4′-methylene dianiline and a salt with a prepolymer of selected diisocyanates and selected polyester polyols and polyether polyols and prescribed mixtures thereof.

6 Claims, 2 Drawing Figures

SOLID POLYURETHANE TIRE AND WHEEL ASSEMBLY

This invention relates to substantially solid industrial wheels or tires. The invention particularly relates to resilient polyurethane solid tires and wheel combinations particularly suitable for use on vehicles adapted for transportation of goods within industrial manufacturing plant facilities.

Industrial vehicles, such as fork lift trucks and slow speed vehicles used for transportation of materials and personnel, many times use solid tires or wheel combinations. Solid tires are especially beneficial for this purpose because they generally exhibit a long life for vehicular use at relatively low speeds and do not simply run flat from punctures.

Indeed, polyurethane wheels or tires have been made for this purpose, although substantial difficulties have been incurred. A diamine curative, such as 4,4'-methylene dianiline, resulted in providing too short a pot life for successful use in a commercial casting processes. Instead, glycol curatives have been used for the polyurethane wheels to which a small amount of triol might be added. Such a system has incurred inherent difficulties. Exemplary of such serious difficulties include the typical requirement aging of the final product to obtain good physical properties. On this basis, when freshly prepared tires are put to use on vehicles without proper aging, they can exhibit substantially physical properties. Further exemplary of processing difficulties involve the sensitivity of the delicate balance between the glycol and isocyanate groups in the polyurethane reaction system. If the balance is not close to exact, physical properties of the product suffer. Furthermore, as the wheel size and volume increase, cure rates appear to be detrimentally affected with an attendant difficulty in retaining a desired balance of necessary properties for the wheel.

Therefore, it is an object of this invention to provide a resilient, substantially solid, polyurethane industrial tire, or wheel assembly, suitable for use on industrial vehicles.

In accordance with this invention, a substantially solid industrial wheel containing a polyurethane ground-contacting portion is provided where said polyurethane is prepared by the method which comprises reacting a complex of 4,4'-methylene dianiline and a salt selected from sodium chloride, sodium bromide, sodium iodide, sodium nitrile, lithium chloride, lithium bromide, lithium iodide, lithium nitrite and sodium cyanide, where the mole ratio of said dianiline to said salt is about 3/1, with at lest one prepolymer selected from the reaction product of a diisocyanate selected from 2,4- and 2,6-toluene diisocyanate, diphenyl methane-4,4'-diisocyanate, 3,3'-dimethyldiphenyl methane-4,4'-diisocyanate, 1,5-naphthylene diisocyanate and 3,3'-bitolylene-4,4'-diisocyanate with at least one polymeric polyol having a molecular weight in the range of about 800 to about 3200, preferably about 800 to about 2500, and a hydroxyl functionality in the range of about 2 to about 2.8, preferably about 2 to about 2.3, and even more preferably about 2, selected from A. polyester polyols selcted from (1) caprolactone polyesters as the product of a caprolactone, such as ε-caprolactone with diethylene glycol, or a hydrocarbon diol containing 4 to 7 carbon atoms such as 1,4-butane diol, 1,5-pentane diol, and 1,6-hexane diol, preferably diethylene glycol, (2) the condensation of low molecular weight saturated hydrocarbon diols containing 3 to 10 carbon atoms with an organic polycaboxylic acid selected from succinic acid, adipic acid and azelaic acid, as well as anhydrides of such acids, B. polyol mixtures containing about 75 to about 100 weight percent of said polyester polyols of (A) and, correspondingly, about 25 to about zero weight per cent of polyether polyols of the type prepared by (1) polymerizing or copolymerizing alkylene oxides containing 1 to 4 carbon atoms such as ethylene oxide, propylene oxide and butylene oxide, (2) polymerizing or copolymerizing low molecular weight glycols such as ethylene glycol, 1,3-propane diol and 1,4-butane diol, (3) or by the reaction of one or more of said alkylene oxides with said glycols and, optionally, with a triol such as trimethylol propane, C. a polyol mixture containing about 25 to about 50 weight percent of said polyether polyols and, correspondingly, about 75 to about 50 weight percent of a polyester polyol selected from polyethylene adipate, polyethylene propylene adipate and polydiethylene adipate, D. a polyol mixture comprising about 50 to about 100 weight percent of polyester polyol (A) and, correspondingly, about 50 to about 0 weight percent of a polyester polyol selected from polyethylene adipate, polyethylene propylene adipate and polydiethylene adipate, E. about 75 to about 100 weight percent prepolymer (A) and correspondingly, about 25 to about zero weight percent of a prepolymer derived from the reaction of said diisocyanate and at least one of said polyether polyols, F. about 50 to about 75 weight percent of the reaction product of said diisocyanate and at least one polyester polyol selected from polyethylene adipate, polyethylene propylene adipate and polydiethylene adipate and, correspondingly, about 50 to about 25 weight percent of the reaction product of a diisocyanate and said polyether polyol, and G. about 50 to about 100 weight percent of prepolymer (A) and, correspondingly, about 50 to about 0 weight percent of the reaction product of said diisocyanate and a polyester polyol selected from polyethylene adipate, polyethylene propylene adipate and polydiethylene adipate, where the ratio of isocyanato groups of said diisocyanate to hydroxyl groups of said polymeric polyols is in the range of about 1.5/1 to about 3/1, preferably about 1.7/1 to about 2.3/1 and where the amino groups of said 4,4'-methylene dianiline complex to excess isocyanato groups over said hydroxyl groups is in the range of about 0.7/1 to about 1.2/1, preferably about 0.8/1 to about 0.95/1

The cured polyurethane is typically and preferably characterized by having a compression set of about 15 to about 25 percent determined by ASTM D-395 Method B and a Goodrich flex life of at least about 15 minutes (ASTM D-623 test modified by having a 437 psi load at 38° C starting temperature and a 0.15 inch stroke. The cured polyurethane is preferably further characterized by having a 300 percent modulus in the range of about 1,000 to about 2500, preferably about 1200 to about 2100, as measured by an Instron tester with a cross head speed of about 20 inches per minute at about 25° C. In the practice of this invention, it is particularly preferred that the industrial wheel is comprised of either the solid polyurethane or a rigid core, hub or rim containing an outer polyurethane ground contacting portion. Generally, a rigid steel insert is desired in the center of the wheel for engaging an axle of an industrial vehicle and to facilitate mounting the tire.

In the further practice of this invention, it is generally preferred that the industrial tire is prepared by charging a suitable mold with a liquid mixture of (I) a salt, such as sodium chloride, complex of 4,4'-methylene dianiline with (II) the reaction product of (A) at least one of said diisocyanates, preferably diphenyl methane-4,4'-diisocyanate and (B) at least one polymeric polyol, preferably having an average molecular weight in the range of about 800 to about 2500 and a hydroxyl functionality preferably in the range of about 2 to about 2.3 primarily selected from said combinations of polyether and polyester polyols, preferably from (1) caprolactone polyesters as the product of ε-caprolactone with diethylene glycol, (2) tetramethylene adipate, (3) polypropylene adipate, (4) a mixture of polypropylene adipate and polyethylene adipate, (5) a polyester polymer polyol mixture of polydiethylene adipate and polypropylene glycol, (6) polytetramethylene azelate and (7) a mixture of polytetramethylene azelate and polytetramethylene ether glycol.

More generally, the tire of this invention can conveniently be prepared by pouring or injecting the reaction mixture of polyurethane precursors into a suitable mold cavity and curing at a temperature in the range of about 80° to about 200° C for a period of about 1 hour to about 24 hours. The actual curing period and temperature can be varied somewhat depending on both the chosen reactants and upon the size and configuration of the solid tire itself.

Surprisingly, in the practice of this invention, the resulting solid industrial-type tire typically contains only a minimal cure gradient of physical properties within its body portion in spite of substantial cure-temperature gradient occurring during the curing process caused by inherent internal heat build-up. This particular advantage especially enhances the practice of this invention as the dimensions, or volume, of the tire to be prepared increases.

The recipes for preparation of the solid wheels, or tires, of this invention have distinct processing advantages. The prepolymer of diisocyanate and polymeric polyol can be maintained at a relatively low temperature in the range of about 65°–85° C, thus minimizing loss of isocyanate content. Shrinkage resulting in defective wheels or tires is essentially eliminated. Long pot life, or time until mixture set-up, is available after addition of the complex of 4,4'-methylene dianiline. Indeed, the 4,4'-methylene dianiline complex is substantially unactive as a curing agent at about 25° C, but demonstrates a fairly rapid reaction or curing rate at a temperature in the range of about 75° to about 130° C.

To facilitate ease of incorporation into the polyurethane system, particularly with rapid mixing with an isocyanate-terminated polyurethane prepolymer, the 4,4'-methylene dianiline complex can be conveniently and preferably first dispersed in a plasticizer. Generally such a complex dispersion contains about 50 to about 150, preferably about 60 to about 120, parts by weight plasticizer per 100 parts by weight complex. Representative of various preferably relatively chemically inert plasticizers include, for example, dioctyl phthalate, tetraethylene glycol di(2-ethylhexoate) and dibutoxyethoxyethyl formal. Dioctyl phthalate is preferred. Indeed, dioctyl phthalate especially enhances the ease of incorporation into the prepolymer and beneficially modifies and somewhat slows, or controls, the rate of curing of said prepolymer of a diisocyanate and selected polyester/polyether polyol mixture recipe.

The 4,4'-methylene dianiline complex can conveniently be prepared, for example, by mixing a dilute aqueous sodium salt solution with salt solution of 4,4'-methylene dianiline in an alcohol, such as methanol or isopropanol, and allowing the mixture to react in about a 1:3 ratio of salt to methylene dianiline. The complex is recovered as a precipitate by ordinary means.

For further understanding of this invention, reference may be had to the accompanying drawing in which.

Figure 1:
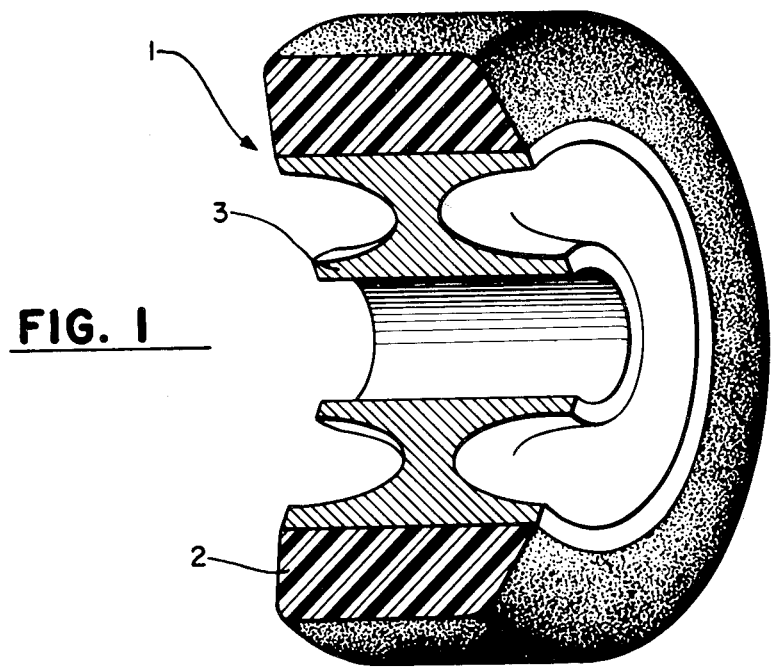
FIG. 1 is a perspective view having a cut-away portion illustrating a wheel consisting of a solid polyurethane tire fitted over a metal hub or rim.
Figure 2:
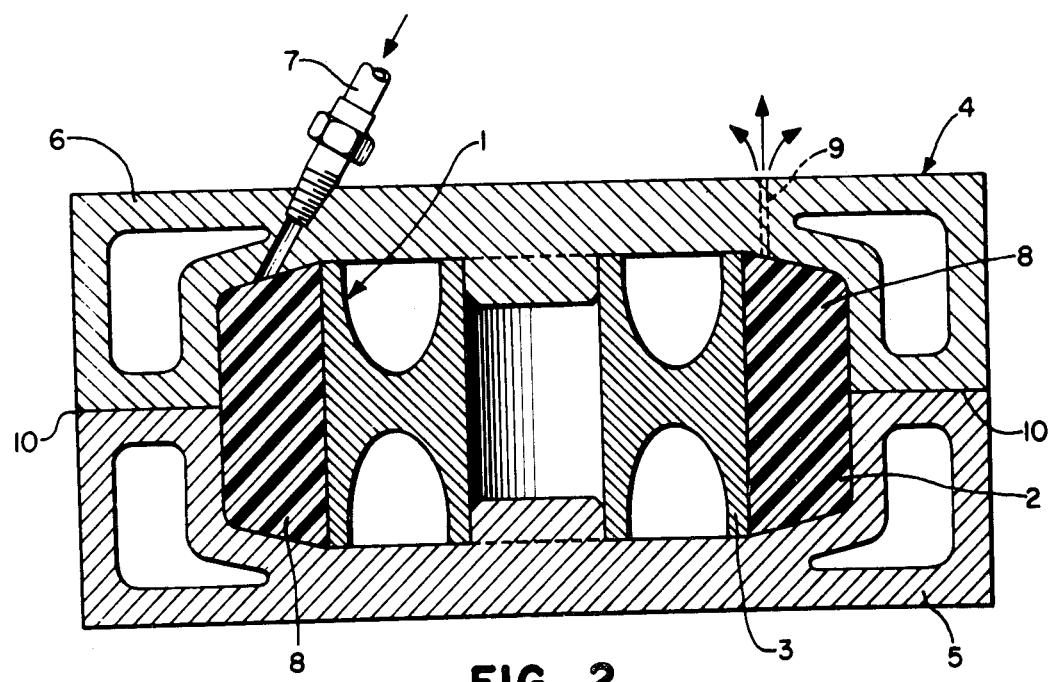
FIG. 2 is a vertical cross sectional view of such a wheel contained in a mold suitable for its preparation.

Referring to the drawing, the wheel 1 having the especially beneficial and unique solid polyurethane tire 2 adhered to the central core 3, which may also be termed a hub or rim, is shown. Such a wheel can conveniently be step wise prepared by fitting a hub 3 into a suitable mold 4 and particularly positioned in its bottom portion 5. The top portion 6 of the mold is then fitted over the hub 3 and the required polyurethane liquid precursors reaction mixture is injected through an inlet nozzle 7 into the mold cavity surrounding the positioned hub 3. As the polyurethane reaction mixture 8 fills the mold cavity around the hub 3, air is allowed to exit or exhaust through a vent 9. The mold assembly 4 is placed in a hot air oven where the polyurethane reaction mixture 8 is allowed to cure for several hours at about 250° C. The mold assembly 4 is then removed from the oven, broken apart at its seam line 10 and the resulting wheel 1 removed and conveniently installed on the axle of an industrial vehicle, such as a fork lift truck.

The practice of this invention is further illustrated by reference to the following examples which are intended to be representative rather than restrictive of the scope of the invention. Unless otherwise indicated, all parts and percentages are by weight.

EXAMPLE I

A concave mold having an inside diameter of about 15 inches, a depth of about 5 inches and an inner diameter of about 11¼ inches, was sprayed with a suitable release agent and assembled with a metal baseband positioned within. The baseband had previously been painted with a suitable adhesive. The mold was preheated in an oven at about 66° C for about 1 hour. To the heated mold was charged a mixture of prepolymer and a curative dispersion of a 1/1 weight ratio blend of the sodium chloride complex of 4,4'-methylene dianiline (MDA) and dioctyl phthalate. This curative dispersion was mixed thoroughly and strained through a cloth filter and heated to a temperature of about 45° C.

Both the prepolymer and the curative dispersion had been charged through a casting machine and circulated therein at their respective temperatures so that their weight ratio for casting purposes was controlled and a desired amine level maintained.

The heated tire mold was taken out of the oven and filled with the prepolymer/curative dispersion mixture at a rate of about 2 pounds per minute. Test samples of the reaction mixture were cast after the mold had been filled.

All cast parts were placed in a hot air oven and cured at about 105° C for about 16 hours. The mold was broken apart and the tire removed therefrom after the cure period. Such a tire had an outside diameter of 15 inches, an inside diameter of 11¼ inches and a tread width of five inches. Therefore, the tire itself had a somewhat of a doughnut shape with the metal baseband adhered in its center portion.

Several tires were made according to this method and identified herein as Experiments A-E. The recipe of the reaction mixture makeup, the results of the tests made upon the cast polyurethane as well as the resiliometer tests of the tire itself are more clearly shown in the following Table 1.

TABLE 1

| Compound | A | B | C | D | E |
|---|---|---|---|---|---|
| Poly ε-caprolactone ester (mw 1240) | 70 | | | | |
| Poly ε-caprolactone ester (mw 1980) | 30 | | | | |
| Polytetramethylene adipate (mw 1000) | | 20 | | | |
| Polytetramethylene adipate (mw 2000) | | 80 | | | |
| Polyethylene adipate (mw 1000) | | | 35 | 45 | |
| Polypropylene adipate (mw 1940) | | | 65 | 55 | 100 |
| Diphenylmethane-4,4'-diisocyanate (MDI) | 37.6 | 31.6 | 33.8 | 36.9 | 23.8 |
| Sodium chloride complex of 4,4'-methylene dianiline | 29.8 | 31.0 | 28.2 | 29.2 | 18.7 |
| Physical Tests | | | | | |
| Modulus (25° C) 100% | 1300 | 1200 | 1300 | 1300 | 790 |
| Modulus (25° C) 300% | 2000 | 2000 | 2000 | 1900 | 1300 |
| Modulus (25° C) 500% | 3200 | 2900 | 3100 | 3400 | 1900 |
| Ultimate tensile (psi) | 4800 | 4400 | 4400 | 5400 | 4100 |
| Ultimate elongation (%) | 590 | 620 | 600 | 580 | 730 |
| Modulus (70° C) 100% | 1100 | 920 | — | 880 | — |
| Modulus (70° C) 300% | 1500 | 1200 | — | 1100 | — |
| Modulus (100° C) 100% | 1100 | 900 | — | 680 | — |
| Modulus (100° C) 300% | 1300 | 1100 | — | 810 | — |
| Compression set (%) ASTM D-935 (Method B) | 17 | 18 | 17 | 21 | 19 |
| Cresent tear (ASTM D-624) Die C (lb/in) | 560 | 650 | 620 | 550 | 470 |
| Slit/tear (ASTM D-1938) (lb) | 18 | 28 | 25 | 24 | 23 |
| Goodrich flex life (Modified) Time (min) | 15+ | 15+ | 15+ | 15+ | 15+ |
| Heat rise (° F) | 70 | 70 | 62 | 83 | 50 |
| Tire Test | | | | | |
| Resiliometer results** | | | | | |
| Time (hrs) | 142 | 91 | 164* | 69 | 79* |
| Load at failure | 9900 | 8800 | (7700) | 7700 | (7700) |

*Tire never failed, but test was simply stopped at a 7700 pound load
**For the resiliometer tests, the tire, or wheel assembly, was mounted on a resiliometer and run at 3 mph. Initially, a load of 2200 pounds for 2 hours was applied and then 4400 pounds for 4 hours were put on the tire as a load. The test was continued at load increment increases of 1100 pounds after every 24 hours of running until a blow out or failure would occur. Actually, for Experiments C and E, no blow out occurred during the test. As it can be observed from the table, the tire of Experiment A indicated a very superior performance where it finally blew out after 142 hours and at the 9900 pounds load level. A minimum load of 5500 pounds for a total run time of about 30 hours is generally considered satisfactory. Thus, the resiliometer test of the sample of the tire, or wheel assembly, of these experiments demonstrated that such tires can support an incrementally increased load of at least up to about 7500 pounds for at least about 65 hours at a speed of about 3 mph.

While certain representative embodiments and details have been shown for the purpose of illustrating the invention, it will be apparent to those having skill in this art that various changes and modifications may be made therein without departing from the spirit or scope of the invention.

What is claimed is:

1. A substantially solid industrial polyurethane tire/wheel assembly is provided comprised of a solid polyurethane tire adhered to a centered rigid core adapted to fit to the axle of an industrial vehicle where said polyurethane is prepared by the method which comprises reacting (I) a complex of 4,4'-methylene dianiline and a salt selected from sodium chloride, sodium bromide, sodium iodide, sodium nitrile, lithium chloride, lithium bromide, lithium iodide, lithium nitrite and sodium cyanide, where the mole ratio of said dianiline to said salt is about 3/1, and where said complex is provided as a dispersion in a plasticizer selected from dioctyl phthalate, tetraethylene glycol di(2-ethylhexoate) and dibutoxy ethoxy ethyl formal, said dispersion containing about 50 to about 150 parts by weight plasticizer per 100 parts by weight complex, with (II) at least one prepolymer selected from the reaction product of a diisocyanate selected from 2,4- and 2,6-toluene diisocyanate, diphenyl methane-4,4'-diisocyanate, 3,3'-dimethyldiphenyl methane-4,4'-diisocyanate, 1,5-naphthylene diisocyanate and 3,3'-bitolylene-4,4'-diisocyanate with at least one polymeric polyol having a molecular weight in the range of about 800 to about 3200, preferably about 800 to about 2500, and a hydroxyl functionality in the range of about 2 to about 2.8, selected from A. polyester polyols selected from (1) the product of ε-caprolactone with a diol selected from diethylene glycol and hydrocarbon diols selected from 1,4-butane diol, 1,5-pentane diol, and 1,6-hexane diol, (2) the condensation of low molecular weight saturated hydrocarbon diols containing 3 to 10 carbon atoms with an organic polycarboxylic acid selected from succinic acid, adipic acid and azelaic acid, as well as anhydrides of such acids, B. polyol mixtures containing about 75 to about 100 weight percent of said polyester polyols of (A) and, correspondingly, about 25 to about zero weight percent of polyether polyols of the type prepared by (1) polymerizing or copolymerizing alkylene oxides selected from ethylene oxide, propylene oxide and butylene oxide, (2) polymerizing or copolymerizing low molecular weight glycols selected from ethylene glycol, 1,3-propane diol and 1,4-butane diol, (3) or by the reaction of one or more of said alkylene oxides with said glycols and, optionally, with the addition of a small amount of a triol such as trimethylol propane, C. a polyol mixture containing about 25 to about 50 weight percent of said polyether polyols and, correspondingly, about 75 to about 50 weight percent of a polyester polyol selected from polyethylene adipate, polyethylene propylene adipate and polydiethylene adipate, D. a polyol mixture comprising about 50 to about 100 weight percent of the polyester polyol of (A) and, correspondingly, about 50 to about 0 weight percent of a polyester polyol selected from polyethylene adipate, polyethylene propylene adipate and polydiethylene adipate, E. about 75 to about 100 weight percent of the prepolymer of (A) and correspondingly about 25 to about 0 weight percent of a prepolymer derived from the reaction of said diisocyanate and at least one of said polyether polyols, F. about 50 to about 75 weight percent of the reaction product of said diisocyanate and at least one polyester polyol selected from polyethylene adipate, polyethylene propylene adipate and polydiethylene adipate, and, correspondingly, about 50 to about 25 weight percent of the reaction product of a diisocyanate and said polyether polyol, and G. about 50 to about 100 weight percent of the prepolymer of (A) and, correspondingly, about 50 to about 0 weight percent of the reaction product of said diisocyanate and a polyester polyol selected from polyethylene adipate, polyethylene propylene adipate and polydiethylene adipate;

where the ratio of isocyanato groups of said diisocyanate to hydroxyl groups of said polymeric polyols is in the range of about 1.5/1 to about 3/1 and where the amino groups of said 4,4'-methylene dianiline complex to excess isocyanato groups over said hydroxyl groups is in the range of about 0.7/1 to about 1.2/1.

2. The polyurethane tire/wheel assembly of claim 1 where said complex is of sodium chloride and 4,4'-methylene dianiline and where said plasticizer is dioctyl phthalate.

3. The solid industrial tire/wheel assembly of claim 1 where said polyurethane is characterized by a compression set of about 15 to about 25 percent at about 25° C according to ASTM D-395 (Method B), a Goodrich flex life of at least about 15 minutes according to ASTM D-623 test, modified by a 437 psi load, 38° C starting temperature and 0.15 inch stroke and a 300 percent modulus in the range of about 1000 to about 2500.

4. The solid polyurethane tire/wheel assembly of claim 1 characterized by supporting an incrementally increased load up to at least about 7500 pounds for at least about 65 hours at a speed of about 3 miles per hour when said wheel assembly has a tire portion with an outside diameter of about 15 inches, a width of about 5 inches and an inside diameter of about 11 inches adhered to a steel centered core.

5. The solid industrial polyurethane tire/wheel assembly of claim 1 where said diisocyanate is selected from diphenylmethane-4,4'-diisocyanate, 3,3'-dimethyldiphenyl-methane-4,4'-diisocyanate and 1,5-naphthylene diisocyanate, where said polymeric polyol has a molecular weight in the range of about 800 to about 2500 and a hydroxyl functionality of about 2, where said polyol is selected from A. polyester polyols selected from (1) the product of ε-caprolactone with diethylene glycol, (2) the condensation of hydrocarbon diols selected from 1,3-propane diol, 1,4-butane diol, and 1,6-hexane diol with an organic polycarboxylic acid selected from adipic acid and azelaic acid;

B. polyol mixtures of said polyester polyols of (A) and polyether polyols of the type prepared from (1) polymerizing or copolymerizing said alkylene oxides, (2) polymerizing or copolymerizing said glycols, (3) or by the reaction of one or more of said alkylene oxides with said glycols and, optionally, with the addition of a small amount of trimethylol propane;

C. a polyol mixture of said polyether polyols and polyester polyols selected from polyethylene adipate, polyethylene propylene adipate and polydiethylene adipate;

D. a polyol mixture of the polyester polyols of (A) and a polyester polyol selected from polyethylene adipate, polyethylene propylene adipate and polydiethylene adipate;

E. a prepolymer mixture of the prepolymer of (A) and a prepolymer derived from the reaction of at least one of said diisocyanates of this claim and at least one of said polyether polyols;

F. a prepolymer mixture of (1) the reaction product of at least one of said diisocyanates of this claim and at least one polyester polyol selected from polyethylene adipate, polyethylene propylene adipate and polydiethylene adipate and (2) the reaction product of at least one of said diisocyanates of this claim and said polyether polyols and G. a prepolymer mixture of (1) the prepolymer of (A) and (2) the reaction product of at least one of said diisocyanates of this claim and a polyester polyol selected from polyethylene adipate, polyethylene propylene adipate and polydiethylene adipate;

where the ratio of isocyanato groups of said diisocyanate to hydroxyl groups of said polymeric polyols is in the range of about 1.7/1 to about 2.3/1 and where the amino groups of said 4,4'-methylene dianiline complex to excess isocyanato groups over said hydroxyl groups is in the range of about 0.8/1 to about 0.95/1 and where said complex is of sodium chloride and 4,4'-methylene dianiline dispersed in dioctyl phthalate.

6. A method of preparing the solid polyurethane tire/wheel assembly of claim 1 which comprises applying the polyurethane precursors, as a fluid reaction mixture, into a mold cavity in which a rigid centered core member has been inserted, curing said reaction mixture at a temperature in the range of about 80° to about 200° C to form the resilient polyurethane tire portion adhered to the rigid core member, thereby defining a wheel assembly, and removing said assembly from the mold.

* * * * *